(12) United States Patent
Farkas et al.

(10) Patent No.: US 7,099,967 B2
(45) Date of Patent: *Aug. 29, 2006

(54) SYSTEM AND METHOD FOR STORING AN IMAGE FILE IN A COMPUTER SYSTEM

(75) Inventors: Ivan Farkas, Roseville, CA (US); Peter M. Piotrowski, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/743,610

(22) Filed: Dec. 22, 2003

(65) Prior Publication Data

US 2005/0138615 A1 Jun. 23, 2005

(51) Int. Cl.
*G06F 13/00* (2006.01)
*G06F 9/00* (2006.01)
*G06F 13/12* (2006.01)

(52) U.S. Cl. .................. 710/104; 717/169; 713/1; 713/2; 711/113

(58) Field of Classification Search .............. None
See application file for complete search history.

(56) References Cited

U.S. PATENT DOCUMENTS

| | | | |
|---|---|---|---|
| 5,201,045 A * | 4/1993 | Pflueger et al. | 714/4 |
| 5,579,522 A | 11/1996 | Christeson et al. | |
| 6,026,016 A * | 2/2000 | Gafken | 365/185.04 |
| 6,055,632 A | 4/2000 | Deegan et al. | |
| 6,188,602 B1 * | 2/2001 | Alexander et al. | 365/185.04 |
| 6,253,281 B1 | 6/2001 | Hall | |
| 6,275,931 B1 | 8/2001 | Narayanaswamy et al. | |
| 6,357,021 B1 | 3/2002 | Kitagawa et al. | |
| 6,445,316 B1 * | 9/2002 | Hsu et al. | 341/120 |
| 6,601,212 B1 * | 7/2003 | Guha et al. | 714/776 |
| 6,816,963 B1 * | 11/2004 | Krithivas et al. | 713/1 |
| 6,901,523 B1 * | 5/2005 | Verdun | 713/320 |
| 6,912,610 B1 * | 6/2005 | Spencer | 710/240 |
| 6,948,031 B1 * | 9/2005 | Chilton | 711/113 |
| 2003/0093589 A1 | 5/2003 | Wu et al. | |
| 2003/0179703 A1 | 9/2003 | Levy et al. | |
| 2003/0217257 A1 * | 11/2003 | Ebsen et al. | 713/100 |

OTHER PUBLICATIONS

A copy of GB Search Report for Application No. GB427601.0 mailed on Apr. 1, 2005 (3 pages).

* cited by examiner

*Primary Examiner*—Rehanna Perveen
*Assistant Examiner*—Brian Misiura

(57) ABSTRACT

A computer system comprising a memory that includes a host and an image file, a processor configured to execute the host, an input/output (I/O) controller coupled to the processor, and a management processing system coupled to the I/O controller and including a non-volatile memory is provided. The host is configured to cause the processor to provide the image file to the management processing system, and the management processing system is configured to store the image file in the non-volatile memory in response to receiving the image file from the host.

23 Claims, 6 Drawing Sheets

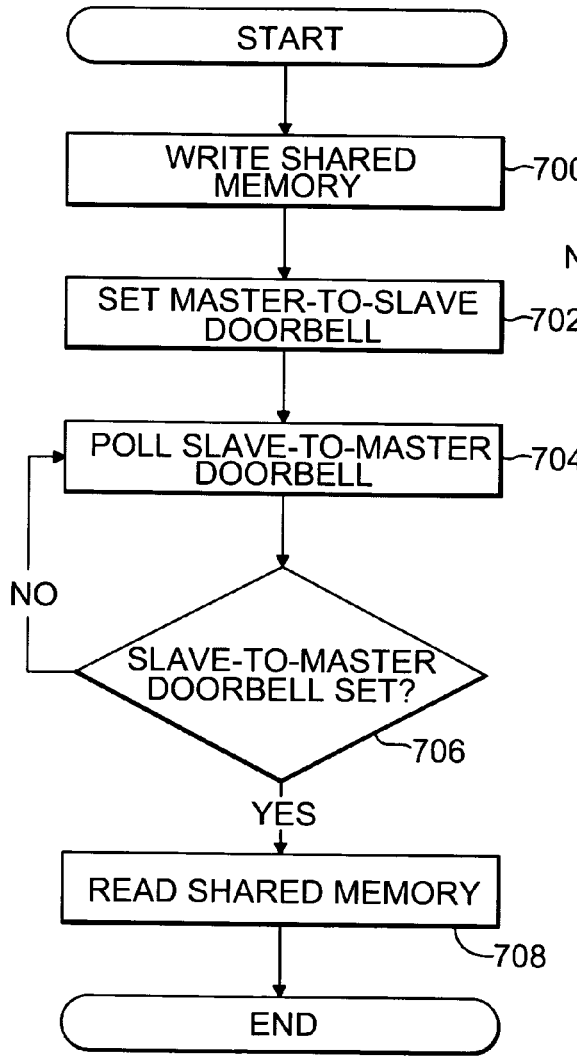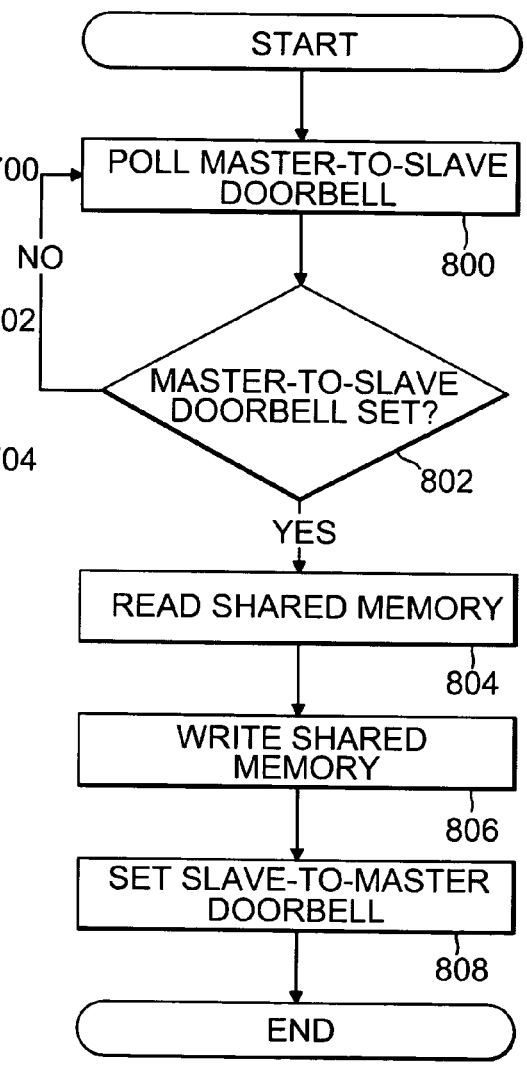
Fig. 7
Fig. 8

SYSTEM AND METHOD FOR STORING AN IMAGE FILE IN A COMPUTER SYSTEM

BACKGROUND

Computer systems typically include components that operate using software built into the components. This software, commonly known as firmware, includes instructions executed by the components in response to the components being powered up, i.e. turned on, or reset. Firmware may perform initialization and set up functions for a component to allow the component to operate with other components in the computer system. Firmware may also interact with the hardware in a component to allow the component to perform its primary functions.

A manufacturer of a component may seek to continually improve firmware of the component. Improvements to the firmware may fix bugs of previous versions of the firmware or provide enhanced or improved functionality. Once improvements are made, however, the new firmware needs to be installed on existing components in order to take effect.

Installing firmware upgrades can be a difficult task for an end user of a computer system. The process can be complicated and errors made in the upgrade process may render a component, or even the entire computer system, inoperable. An end user typically seeks to include the improvements of a firmware upgrade in a computer system without having any problems that can be associated with firmware upgrades. Accordingly, it would be desirable to provide an end user of a computer system with an improved way of updating firmware in one or more components of a computer system.

SUMMARY

According to one exemplary embodiment, a computer system is provided that includes a memory that includes a host and an image file, a processor configured to execute the host, an input/output (I/O) controller coupled to the processor, and a management processing system coupled to the I/O controller and including a non-volatile memory. The host is configured to cause the processor to provide the image file to the management processing system, and the management processing system is configured to store the image file in the non-volatile memory in response to receiving the image file from the host.

BRIEF DESCRIPTION OF THE DRAWINGS

FIG. 7 is a flow chart illustrating an embodiment of a method for communicating with a slave.

FIG. 8 is a flow chart illustrating an embodiment of a method for communicating with a master.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In one aspect of the present disclosure, a computer system provides a system and method for upgrading the firmware of a management processing system coupled to an input/output (I/O) bus in the computer system. The system and method contemplate transferring image files that include a firmware upgrade between a host application (referred to herein as a "host") and the management processing system using a series of messages. The host is executed by the computer system either before or after an operating system is booted by the computer system.

In another aspect of the present disclosure, a computer system provides a communication protocol between a master and a slave in the computer system. The master and slave transfer information between one another using a shared memory and a pair of storage locations, referred to as doorbells. To provide information to the slave, the master stores first information in the shared memory and then sets a master-to-slave doorbell. The slave accesses the first information when it detects that the master-to-slave doorbell has been set. The slave responds by storing second information in the shared memory and setting a slave-to-master doorbell. The master accesses the second information when it detects that the slave-to-master doorbell has been set.

Figure 1:
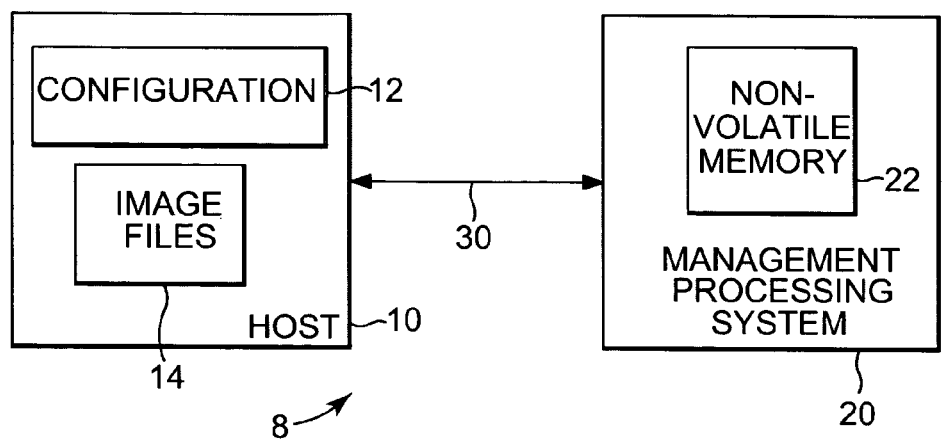
FIG. 1 is a block diagram illustrating an embodiment a system for upgrading firmware of a management processing system.

FIG. 1 is a block diagram illustrating an embodiment a system 8 for upgrading firmware of a management processing system 20. System 8 includes a host 10 that communicates with management processing system 20 as indicated by an arrow 30. Host 10 is configured to perform a firmware upgrade of management processing system 20 using a configuration file 12 and one or more image files 14. Management processing system 20 includes a non-volatile memory (NVM) 22 such as a flash memory.

Host 10 comprises software that is executable by a computer system. Host 10 may be executable by the computer system before or after the computer system boots an operating system. For example, host 10 may be executed as an application prior to an operating system being booted using an Extensible Firmware Interface (EFI) protocol as provided by the Extensible Firmware Interface Specification, version 1.10 or any prior or subsequent versions. The Extensible Firmware Interface Specification, version 1.10 is available from Intel, 2200 Mission College Blvd., Santa Clara, Calif. 95052 USA.

Host 10 may also be executed as an application under the Intermediate System Loader (ISL) Standalone Environment. ISL is a program run after execution of the firmware in a computer system, such as a PA-RISC computer system. ISL implements a command line interface which allows the user to obtain information on the bootup characteristics of the system; to modify these characteristics; and to load and execute programs such as the operating system, ISL-based tools, and host 10.

Host 10 may further be executed as an application under an operating system.

In response to being executed, host 10 causes image files 14 to be provided to management processing system 20 according to information in configuration file 12. The information in configuration file 12 may include a list that identifies image files 14, an order of providing image files 14 to management processing system 20, a set of conditions that may need to be present for the firmware upgrade to be undertaken, or other information that may be used to upgrade the firmware of management processing system 20. Image files 14 each include a portion of a firmware upgrade. The portions may be transferred to management processing system 20 in an order dictated by configuration file 12.

In response to receiving an image file 14, management processing system 20 causes the image file 14 to be stored in NVM 22. Management processing system 20 may receive each image file 14 in a memory (not shown in FIG. 1) included in management processing system 20 and may store each image file 14 in one or more intermediate memories (not shown in FIG. 1) prior to storing image files 14 in NVM 22.

Figure 2:
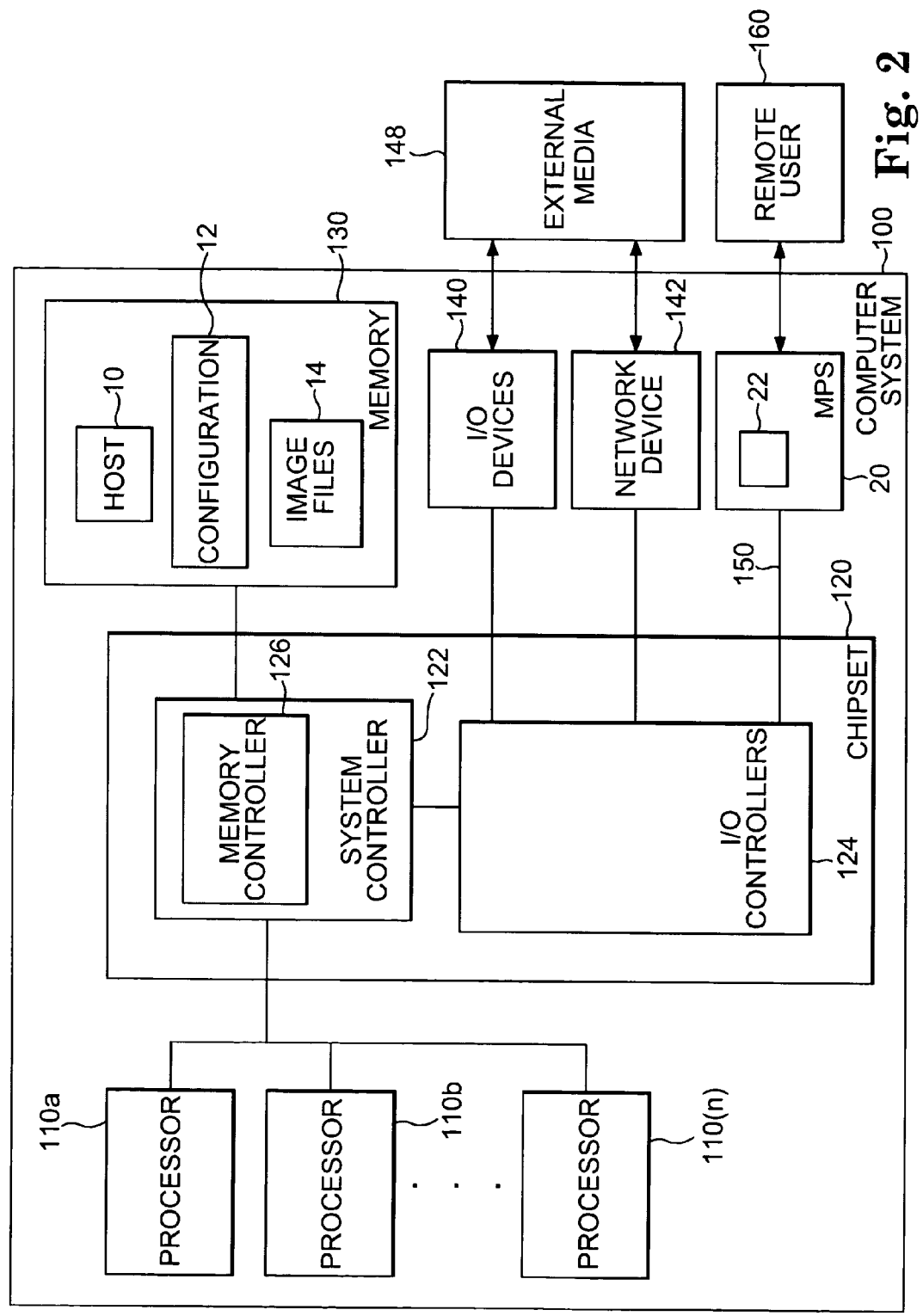
FIG. 2 is a block diagram illustrating an embodiment of a computer system that incorporates the embodiment shown in FIG. 1.

Although shown as part of host 10 in FIG. 1, configuration file 12 and image files 14 may be storable separately from host 10 in other embodiments, such as in the embodiment shown in FIG. 2.

FIG. 2 is a block diagram illustrating an embodiment of a computer system 100 that incorporates the embodiment shown in FIG. 1. Computer system 100 may be any type of computer system such as a handheld, desktop, notebook, mobile, workstation, or server computer. Computer system 100 includes processors 110a through 110(n), a chipset 120, a memory 130, a set of input/output (I/O) devices 140, a network device 142 and management processing system 20.

Computer system 100 includes any number of processors greater than or equal to one where processor 110(n) refers to the nth processor. As used herein, 'processor 110' refers to any one of processors 110a through 110(n), and 'processors 110' refers to the set of processors 110a through 110(n). Processors 110 may include or be operable with any type or number of caches.

Computer system 100 also includes an operating system (not shown) that is executable by one or more of processors 110. In response to being turned on or reset, one or more of processors 110 cause the operating system to be booted and executed. Processors 110 execute instructions from the operating system and other programs using memory 130.

Chipset 120 includes a system controller 122 and a set of I/O controllers 124. System controller 122 includes a memory controller 126 which is configured to store information into and read information from memory 130 in response to write and read transactions, respectively, from processors 110, I/O devices 140, network device 142, and management processing system 20. Memory controller 126 may include hardware and/or software configured to perform memory scrubbing or other error correction functions on memory 130 in response to reading information from memory 130.

I/O controllers 124 may include any type and number of controllers and bus bridges configured to manage one or more I/O devices 140, network device 142, and management processing system 20. Examples of I/O controllers 124 include IDE/ATA controllers, SATA controllers, PCI controllers, SCSI controllers, USB controllers, IEEE 1394 (Firewire) controllers, PCMCIA controllers, parallel port controllers, and serial port controllers. In one embodiment, I/O controllers 124 comprise multiple microchips that include an intermediate bus coupled to system controller 122, PCI controllers coupled to the intermediate bus, and SCSI, IDE and others controllers coupled to the PCI controllers. As used herein, 'I/O controller 124' refers to a single I/O controller in I/O controllers 124, and 'I/O controllers 124' refers to the set of I/O controllers 124.

Memory 130 comprises any type of memory managed by memory controller 126 such as RAM, SRAM, DRAM, SDRAM, and DDR SDRAM. In response to commands from system firmware (not shown) or the operating system, memory controller 126 may cause information to be loaded from an external media 148 using an I/O device 140, such as a hard drive or a CD-ROM drive, or network device 142 into memory 130.

I/O devices 140 may include any type and number of devices configured to communicate with computer system 100 using I/O controllers 124. Each I/O device 140 may be internal or external to computer system 100 and may couple to an expansion slot in a motherboard or a connector in a chassis that houses computer system 100 that is in turn coupled to an I/O controller 124. As used herein, 'I/O device 140' refers to a single I/O device in I/O devices 140, and 'I/O devices 140' refers to the set of I/O devices 140.

Network device 142 is configured to allow computer system 100 to communicate with other computer systems and storage devices (not shown) by transferring information between computer system 100 and other computer systems and storage devices.

Management processing system 20 is coupled to computer system 100 using a bus 150 coupled to an I/O controller 124. In one embodiment, I/O controller 124 comprises a PCI controller and bus 150 comprises a PCI bus according to PCI Local Bus Specification, Revision 2.3 or any prior or subsequent revisions. PCI Local Bus Specification, Revision 2.3, is available from PCI Special Interest Group, 5440 SW Westgate Drive, Suite 217, Portland, Oreg. 97221, USA. In other embodiments, I/O controller 124 comprises another type of I/O controller and bus 150 comprises another type of bus.

Management processing system 20 is configured to execute firmware (not shown) to allow management processing system 20 to perform a variety of functions with respect to computer system 100. For example, management processing system 20 is configured to provide access to information in computer system 100 to a remote user 160 using one or more network connections (not shown) of management processing system 20, such as a 10/100 LAN port, a modem port, or a RS-232 console port. The information may include status information or other types of information associated with computer system 100. Management processing system 20 may also provide remote user 20 with access to a system console (not shown) of computer system 100. The system console may be used to control certain settings or functions of computer system 100. In addition, management processing system 20 may allow remote user 160 to manage computer system 100 by integrating external management applications, provide environmental health and fault management of computer system 100, provide security functions, and collaboration capabilities with other computer systems (not shown).

As noted above with reference to FIG. 1, host 10 is configured to cause the firmware of management processing system 20 to be upgraded using configuration file 12 and image files 14. In the embodiment shown in FIG. 2, host 10 is executable by one or more of processors 110 using memory 130. Prior to or in response to being executed by computer system 100, host 10, configuration file 12 and image files 14 may be accessed from an internal media, such as a hard disk drive, or external media 148 and copied into memory 130.

In response to being executed, host 10 causes image files 14 to be provided to management processing system 20 by causing a plurality of messages to be provided to management processing system 20. The messages include control messages and data transfer messages that are created by one or more processors 110 in response to instructions in host 10. The one or more processors 110 cause the messages to be provided to system controller 122 which, in turn, provides the messages to an I/O controller 124 coupled to management processing system 20. The I/O controller 124, in turn, provides the messages to management processing system 20.

Management processing system 20 also provides messages to host 10 by providing messages to the I/O controller 124. The I/O controller 124 provides the messages to system controller 122, and system controller 122, in turn, provides the messages to host 10 by way of processors 110 and/or memory 130.

Figure 3:
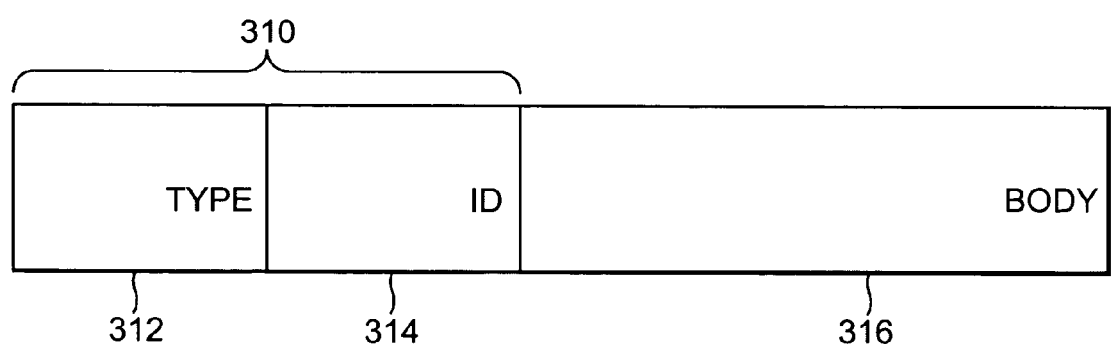
FIG. 3 is a block diagram illustrating an embodiment of a message.

FIG. 3 is a block diagram illustrating an embodiment of a message 300. Message 300 includes a header 310 and a body 316. Header 310 includes a type indicator 312 and an ID indicator 314.

Type indicator 312 indicates whether a message 300 is a control message or a data transfer message. ID indicator 314 indicates an ID of a message 300. A control message may be a start upgrade message with a start upgrade ID, an end upgrade message with an end upgrade ID, a start file transfer message with a start file transfer ID, an end transfer message with an end file transfer ID, or an acknowledge message with an acknowledge ID. A data transfer message may be a transmit data message with a transmit data ID.

A start upgrade message is provided from host 10 to management processing system 20 to indicate that host 10 is initiating an upgrade process. A start upgrade message includes an upgrade mode indicator to indicate actions for management processing system 20 to take, such as download and flash program, download and compare, or download with no flash program. An end upgrade message is provided from host 10 to management processing system 20 to indicate that an upgrade process has completed.

A start file transfer message is provided from host 10 to management processing system 20 to indicate that an image file 14 is about to be provided from host 10 to management processing system 20. A start file transfer message includes parameters such as a section, a flash address, a file size, a checksum, and a revision number. An end transfer message is provided from host 10 to management processing system 20 to indicate that an image file 14 has been provided from host 10 to management processing system 20.

An acknowledge message is provided from either host 10 to management processing system 20 or management processing system 20 to host 10 to indicate that an expected message has been received. An acknowledge message includes a completion code to indicate a result of an action caused by a previous message, e.g., image portion stored, error detected, etc.

A data transfer message is provided from host 10 to management processing system 20 to provide a portion of an image file 14 from host 10 to management processing system 20. A transmit data message includes parameters such as a length of the transmit data message, a checksum, and a sequence indicator along with a portion of an image file 14.

Figure 4:
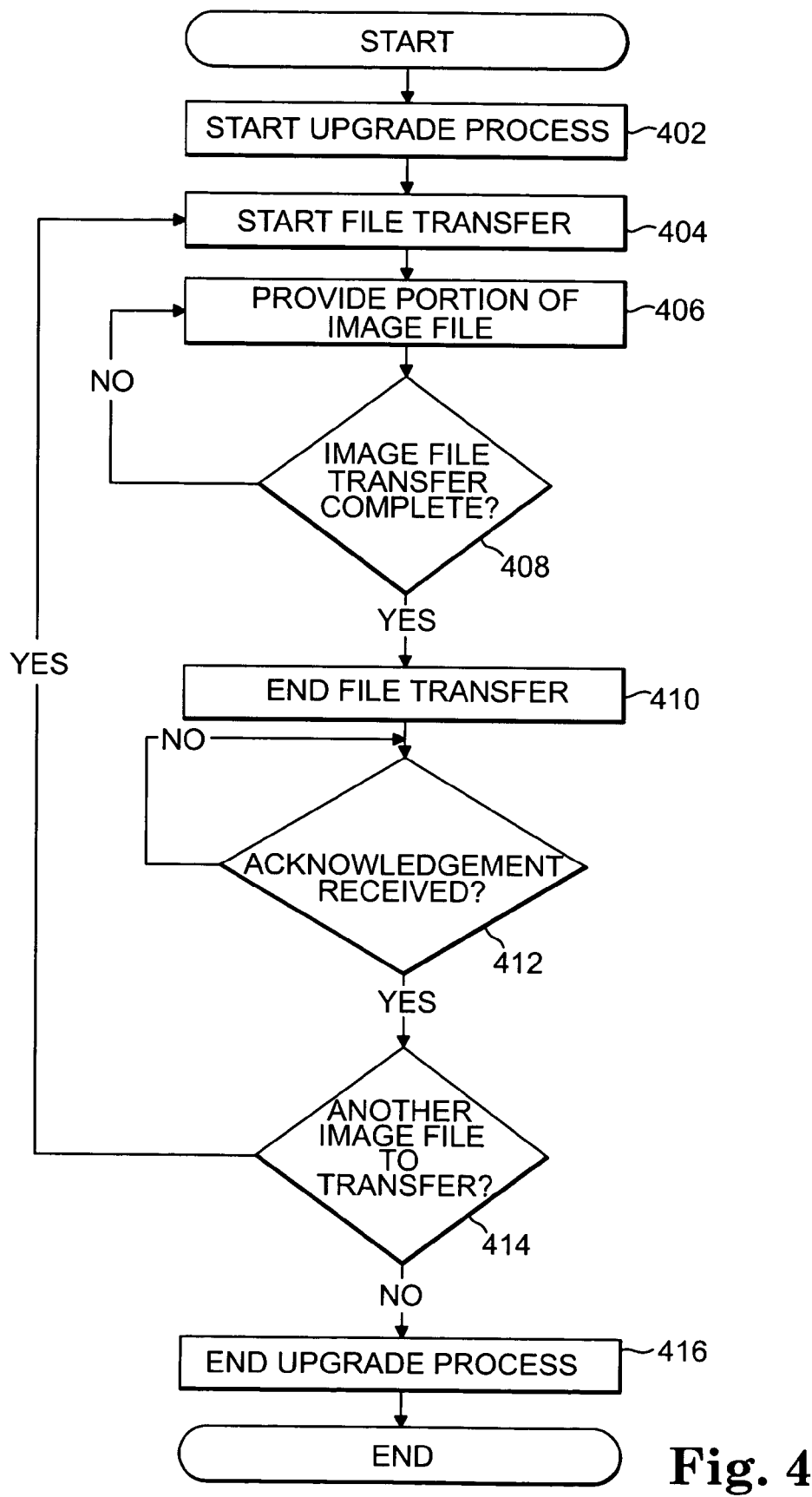
FIG. 4 is a flow chart illustrating an embodiment of a method for transferring information to a management processing system.

FIG. 4 is a flow chart illustrating an embodiment of a method for transferring information to management processing system 20. The method illustrated in FIG. 4 may be implemented by host 10 as described in additional detail below.

In FIG. 4, an upgrade process is started as indicated in a block 402. Host 10 initiates the upgrade process by causing a start upgrade message to be generated and provided to management processing system 20. A file transfer is started as indicated in a block 404. Host 10 starts the file transfer by causing a start file transfer message to be generated and provided to management processing system 20. A portion of an image file is provided to management processing system 20 as indicated in a block 406. Host 10 provides the portion by causing a transmit data message that includes the portion to be generated and provided to management processing system 20.

A determination is made as to whether the image file transfer is complete as indicated in a block 408. Host 10 determines that the image file transfer is complete in response to detecting that all portions of the image file have been provided to management processing system 20. If the image file transfer is not complete, then the functions of blocks 406 and 408 are repeated until the image file transfer is complete. After the image file transfer is complete, a file transfer is ended as indicated in a block 410. Host 10 ends the file transfer by causing an end file transfer message to be generated and provided to management processing system 20.

A determination is made as to whether an acknowledgement has been received from management processing system 20 as indicated in a block 412. Host 10 determines that an acknowledgement has been received in response to receiving an acknowledge message from management processing system 20. If an acknowledgement has not been received, then the determination of block 412 is repeated periodically until a timeout condition occurs.

If an acknowledgement has been received, then a determination is made as to whether there is another image file to transfer as indicated in a block 414. Host 10 determines whether there is another image file to transfer using configuration file 12. If there is another image file to transfer, then the functions of blocks 404 through 414 are repeated. If there is not another image file to transfer, then the upgrade process is ended as indicated in a block 416. Host 10 ends the upgrade process by causing an end upgrade message to be generated and provided to management processing system 20.

Figure 5:
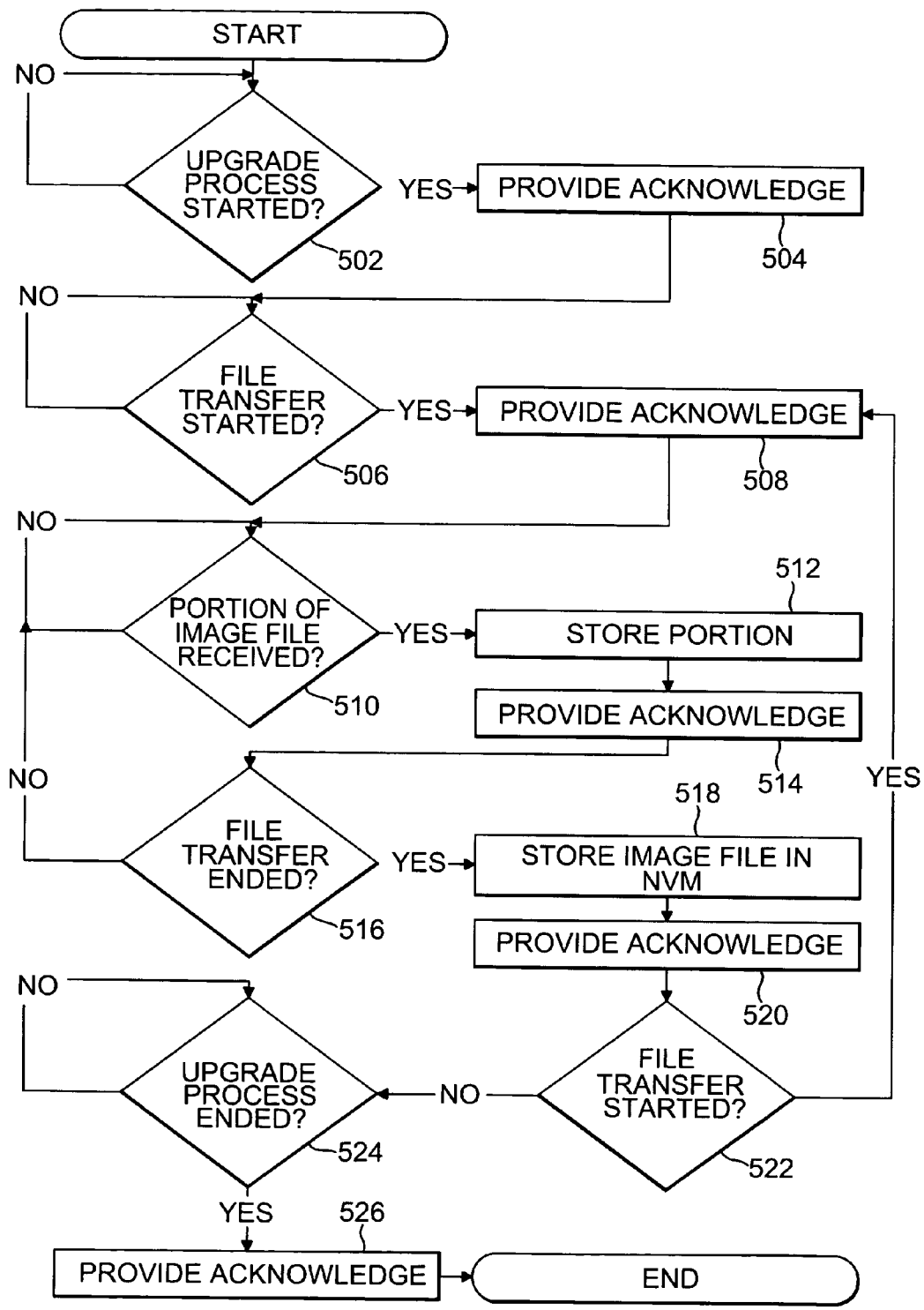
FIG. 5 is a flow chart illustrating an embodiment of a method for receiving information from a host.

FIG. 5 is a flow chart illustrating an embodiment of a method for receiving information from host 10. The method illustrated in FIG. 5 may be implemented by management processing system 20 as described in additional detail below.

In FIG. 5, a determination is made as to whether an upgrade process has been started as indicated in a block 502. Management processing system 20 determines that an upgrade process has been started in response to receiving a start upgrade message from host 10. If an upgrade process has not been started, then the function of block 502 is repeated at a later time. If an upgrade process has been started, then an acknowledgement is provided as indicated in a block 504. Management processing system 20 provides an acknowledgement by generating an acknowledge message and providing the acknowledge message to host 10.

A determination is made as to whether a file transfer has been started as indicated in a block 506. Management processing system 20 determines that a file transfer has been started in response to receiving a start file transfer message from host 10. If a file transfer has not been started, then the function of block 506 is repeated periodically until a timeout condition occurs. If a file transfer has been started, then an acknowledgement is provided as indicated in a block 508. Management processing system 20 provides an acknowledgement by generating an acknowledge message and providing the acknowledge message to host 10.

A determination is made as to whether a portion of an image file has been received as indicated in a block 510. Management processing system 20 determines that a portion of an image file has been received in response to receiving a transmit data message that includes the portion from host 10. If a portion of an image file has not been received, then the function of block 510 is repeated periodically until a timeout condition occurs. If a portion of an image file has been received, then the portion is stored as indicated in a block 512. Management processing system 20 stores the portion in a memory included in management processing system 20. An acknowledgement is provided as indicated in a block 514. Management processing system 20 provides an acknowledgement by generating an acknowledge message and providing the acknowledge message to host 10.

A determination is made as to whether the file transfer has ended as indicated in a block 516. Management processing system 20 determines that the file transfer has ended in response to receiving an end file transfer message from host 10. If the file transfer has not ended, then the function of block 510 is repeated at a later time. If the file transfer has ended, then the image file is stored in a non-volatile memory (NVM) as indicated in a block 518. Management processing system 20 stores the image file in NVM 22 by flash programming the image file in embodiments where NVM 22 comprises flash memory. Management processing system 20 verifies a checksum provided by host 10 prior to storing the image file. An acknowledgement is provided as indicated in a block 520. Management processing system 20 provides an acknowledgement by generating an acknowledge message and providing the acknowledge message to host 10.

A determination is made as to whether a file transfer has been started as indicated in a block 522. Management processing system 20 determines that a file transfer has been started in response to receiving a start file transfer message from host 10. If a file transfer has been started, then the function of block 508 is repeated. If a file transfer has not been started, then a determination is made as to whether the upgrade process has ended as indicated in a block 524. Management processing system 20 determines that the upgrade process has ended in response to receiving an end upgrade message from host 10. If the upgrade process has not ended, then the function of block 524 is repeated periodically until a timeout condition occurs. If the upgrade process has ended, then the method ends.

If a timeout occurs in the embodiments of FIGS. 4 and 5, then the upgrade process is cancelled. Host 10 may retry the upgrade process at a later time.

Figure 6:
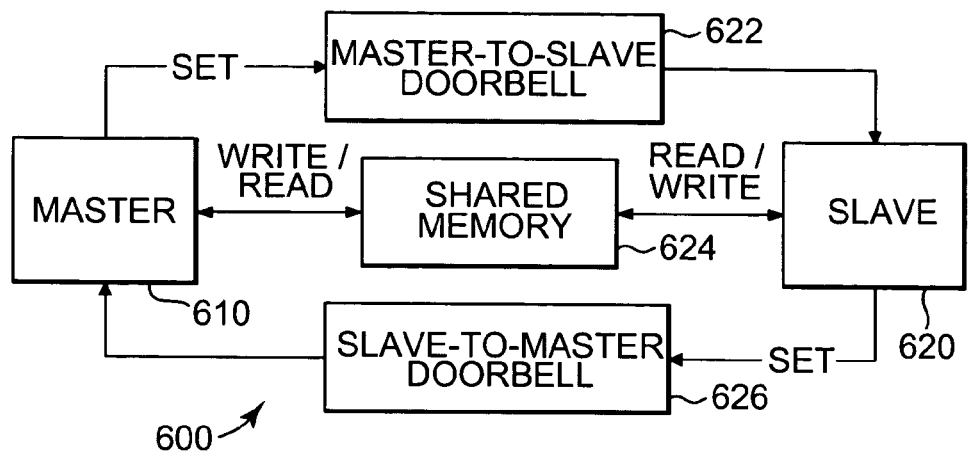
FIG. 6 is a block diagram illustrating an embodiment of a system for transferring and receiving information between a master and a slave.

FIG. 6 is a block diagram illustrating an embodiment of a system 600 transferring and receiving information between a master 610 and a slave 620. System 600 includes a master-to-slave doorbell 622, a shared memory 624, and a slave-to-master doorbell 626. Master-to-slave doorbell 622 and a slave-to-master doorbell 626 each comprise storage locations, e.g., registers, configured to be set by master 610 and slave 620, respectively.

Master 610 is configured to set master-to-slave doorbell 622, read from and write to shared memory 624, and read slave-to-master doorbell 626. Slave 620 is configured to read master-to-slave doorbell 622, read from and write to shared memory 624, and set slave-to-master doorbell 626. The operation of master 610 will be described with reference to FIG. 7, and the operation of slave 620 will be described with reference to FIG. 8.

FIG. 7 is a flow chart illustrating an embodiment of a method for communicating with slave 620. In FIG. 7, shared memory 624 is written as indicated in a block 700. Master-to-slave doorbell 622 is set as indicated by a block 702. Master 610 may cause master-to-slave doorbell 622 to be set by storing a known value in master-to-slave doorbell 622.

Slave-to-master doorbell 626 is polled as indicated in a block 704. Master 610 may cause slave-to-master doorbell 626 to be polled by periodically accessing slave-to-master doorbell 626. A determination is made as to whether slave-to-master doorbell 626 is set as indicated in a block 706. If slave-to-master doorbell 626 is not set, then the functions of blocks 704 and 706 are repeated at a later time. If slave-to-master doorbell 626 is set, then shared memory 624 is read as indicated in a block 708.

FIG. 8 is a flow chart illustrating an embodiment of a method for communicating with master 610. In FIG. 8, master-to-slave doorbell 622 is polled as indicated in a block 800. Slave 620 may cause master-to-slave doorbell 622 to be polled by periodically accessing master-to-slave doorbell 622. A determination is made as to whether master-to-slave doorbell 622 is set as indicated in a block 802. If master-to-slave doorbell 622 is not set, then the functions of blocks 800 and 802 are repeated at a later time. If master-to-slave doorbell 622 is set, then shared memory 624 is read as indicated in a block 804.

Shared memory 624 is written as indicated in a block 806. Slave-to-master doorbell 626 is set as indicated by a block 808. Slave 620 may cause slave-to-master doorbell 626 to be set by storing a known value in slave-to-master doorbell 626.

Figure 9:
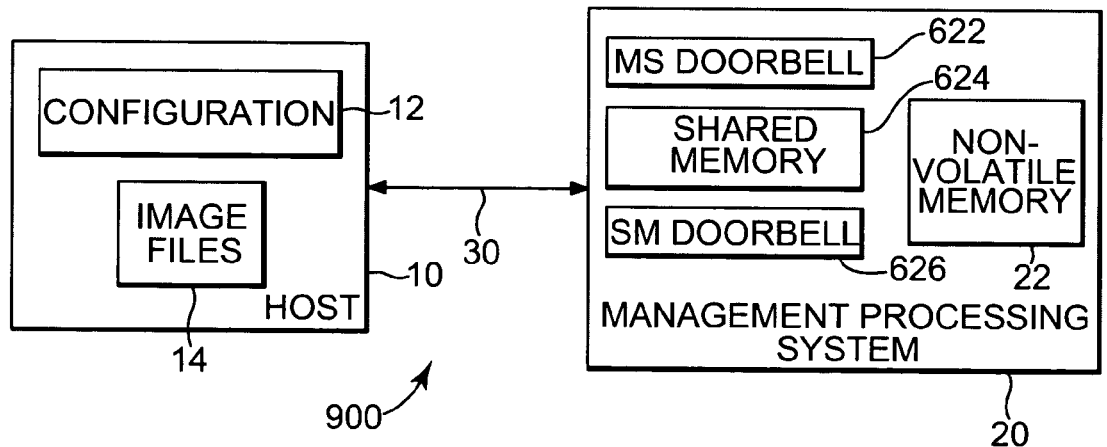
FIG. 9 is a block diagram illustrating an embodiment of a system that incorporates the embodiment shown in FIG. 6.

FIG. 9 is a block diagram illustrating an embodiment of a system 900 that incorporates the embodiment shown in FIG. 6 into the embodiment shown in FIG. 1. In FIG. 9, management processing system 20 includes master-to-slave doorbell 622, shared memory 624, and slave-to-master doorbell 626. In addition, host 10 operates as master 610 as described above, and management processing system 20 operates as slave 620 as described above.

In one embodiment, arrow 30 represents a PCI bus. In this embodiment, host 10, acting as master 610, identifies the address of master-to-slave doorbell 622, the address and size of shared memory 624, and the address of slave-to-master doorbell 626 using a PCI discovery scan. Shared memory 624 may comprise a portion of a main memory (not shown) of management processing system 20 that is mapped into the PCI address space. Management processing system 20 may define the size of shared memory 624.

Referring back to the functions described in FIGS. 4 and 5, host 10 and management processing system 20 communicate, in the embodiment of FIG. 9, by causing messages, including transmit data messages that comprise portions of image files 14, to be stored in shared memory 624 and setting master-to-slave doorbell 622 and slave-to-master doorbell 626, respectively. To upgrade the firmware of management processing system 20, management processing system 20 stores each of the provided image files 14 into NVM 22.

In other embodiments, arrow 30 may represent another type of bus or communications link.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer system comprising:
   a memory comprising a host and an image file;
   a processor configured to execute the host;
   an input/output (I/O) controller coupled to the processor; and
   a management processing system coupled to the I/O controller and comprising a non-volatile memory configured to store first firmware and a network connection that is configured to provide a remote user with access to the computer system, the management processing system configured to execute the first firmware to provide status information associated with the computer system to the remote user using the network connection;
   wherein the host is configured to cause the processor to provide the image file to the management processing system, and wherein the management processing system is configured to store the image file in the non-volatile memory in response to receiving the image file from the host.

2. The computer system of claim 1 further comprising:
   a PCI bus coupled to the I/O controller and the management processing system;
   wherein the I/O controller comprises a PCI controller.

3. The computer system of claim 1 wherein the host is configured to be executed by the processor subsequent to an operating system being booted by the processor.

4. The computer system of claim 1 wherein the host is configured to be executed by the processor prior to an operating system being booted by the processor.

5. The computer system of claim 1 wherein the host is configured to be executed by the processor using an Extensible Firmware Interface (EFI) protocol.

6. The computer system of claim 1 wherein the host is configured to be executed by the processor using an Intermediate System Loader (ISL) protocol.

7. The computer system of claim 1 wherein the host is configured to cause the process to provide the image file to the management processing system using a plurality of messages, and wherein each of the plurality of messages comprises a header and a body.

8. The computer system of claim 7 wherein each of the headers comprises a first indicator that identifies a message type and a second indicator that identifies a message ID.

9. The computer system of claim 1 wherein the host is configured to cause the processor to provide a start file transfer message to management processing system prior to causing the image file to be provided to the management processing system, and wherein the host is configured to cause the processor to provide an end file transfer message to management processing system subsequent to causing the image file to be provided to the management processing system.

10. The computer system of claim 9 wherein the management processing system is configured to store the image file in the non-volatile memory in response to receiving the end file transfer message.

11. The computer system of claim 10 wherein the management processing system is configured to provide an acknowledge message to the host subsequent to storing the image file in the non-volatile memory.

12. The computer system of claim 1 wherein the image file comprises second firmware.

13. The computer system of claim 1 wherein the memory comprises a configuration file, and wherein the processor is configured to cause the image file to be provided to the management processing system in response to information in the configuration file.

14. The computer system of claim 1 wherein the non-volatile memory comprises flash memory.

15. A method performed by a computer system, the method comprising:
    providing a start upgrade message to a management processing system using an input/output (I/O) bus, the management processing system including a non-volatile memory configured to store firmware and a network connection that is configured to provide a remote user with access to the computer system, the management processing system configured to execute the firmware to provide status information associated with the computer system to the remote user using the network connection;
    providing a first start file transfer message to the management processing system using the I/O bus;
    providing a first plurality of transmit data messages that comprise a first image file to the management processing system using the I/O bus;
    providing a first end file transfer message to the management processing system using the I/O bus; and
    receiving a first acknowledge message from the management processing system over the I/O bus indicating that the first image file has been stored.

16. The method of claim 15 further comprising:
    subsequent to receiving the first acknowledge message and in response to determining that there is a second image file to transfer to the management processing system:
       providing a second start file transfer message to the management processing system using the I/O bus;
       providing a second plurality of transmit data messages that comprise the second image file to the management processing system using the I/O bus;
       providing a second end file transfer message to the management processing system using the I/O bus; and
       receiving a second acknowledge message from the management processing system using the I/O bus indicating that the second image file has been stored.

17. The method of claim 15 further comprising:
    providing the first start file transfer message to the management processing system using the I/O bus in response to receiving a second acknowledge message associated with the start upgrade message from the management processing system.

18. The method of claim 15 further comprising:
    providing one of the first plurality of transmit data messages to the management processing system using the I/O bus in response to receiving a second acknowledge message associated with the start file transfer message from the management processing system.

19. The method of claim 15 further comprising:
providing the end file transfer message to the management processing system using the I/O bus in response to receiving a second acknowledge message associated with one of the first plurality of transmit data messages from the management processing system.

20. A computer system comprising:
a memory comprising an image file;
a processor coupled to the memory;
an input/output (I/O) controller coupled to the processor;
a management processing system coupled to the I/O controller and comprising a non-volatile memory configured to store firmware and a network connection that is configured to provide a remote user with access to the computer system, the management processing system configured to execute the firmware to provide status information associated with the computer system to the remote user using the network connection;
a means executable by the processor for causing the processor to:
provide an upgrade message to the management processing system;
provide a start file transfer message to the management processing system;
provide a plurality of transmit data messages that comprise the image file to the management processing system;
provide an end file transfer message to the management processing system; and
receive an acknowledge message from the management processing system indicating that the image file has been stored in the non-volatile memory.

21. The computer system of claim 20 wherein the management processing system is configured to execute the firmware to cause the image file to be stored in the non-volatile memory in response to receiving the end file transfer message.

22. The computer system of claim 21 wherein the management processing system is configured to execute the firmware to cause the acknowledge message to be provided to the means in response to storing the image file in the non-volatile memory.

23. The computer system of claim 20 further comprising:
a PCI bus coupled between the I/O controller and the management processing system.

* * * * *